United States Patent
Baumgarten

(10) Patent No.: US 7,008,026 B2
(45) Date of Patent: Mar. 7, 2006

(54) STEERING BOOSTER PROCESS AND STEERING BOOSTER SYSTEM IN A MOTOR VEHICLE

(75) Inventor: Goetz Baumgarten, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/671,931

(22) Filed: Sep. 29, 2003

(65) Prior Publication Data
US 2004/0055807 A1 Mar. 25, 2004

Related U.S. Application Data

(63) Continuation of application No. PCT/EP02/02275, filed on Mar. 2, 2002.

(30) Foreign Application Priority Data
Mar. 30, 2001 (DE) ............................ 101 15 809

(51) Int. Cl.
*B60T 8/60* (2006.01)

(52) U.S. Cl. .................. 303/146; 303/155; 701/41; 701/70; 180/197

(58) Field of Classification Search ............... 303/146, 303/147, 140, 155; 701/41, 36, 48, 70, 78, 701/82, 80; 180/6.26, 197, 402
See application file for complete search history.

(56) References Cited

U.S. PATENT DOCUMENTS

| | | | | |
|---|---|---|---|---|
| 5,455,770 A | * | 10/1995 | Hadeler et al. | ................ 701/70 |
| 6,226,581 B1 | * | 5/2001 | Reimann et al. | .............. 701/48 |
| 6,279,674 B1 | * | 8/2001 | Lissel et al. | ................ 180/402 |
| 6,449,542 B1 | * | 9/2002 | Bottiger et al. | ............... 701/41 |
| 6,648,426 B1 | * | 11/2003 | Boettiger et al. | ........... 303/146 |

FOREIGN PATENT DOCUMENTS

| | | |
|---|---|---|
| DE | 43 05 155 | 8/1994 |
| DE | 196 32 251 | 2/1998 |
| DE | 197 49 005 | 1/1999 |
| EP | 0 943 515 | 9/1999 |
| EP | 1 000 838 | 5/2000 |

* cited by examiner

*Primary Examiner*—Pam Rodriguez
(74) *Attorney, Agent, or Firm*—Crowell & Moring LLP

(57) ABSTRACT

A steering booster process is provided for a motor vehicle with a steering arrangement for the input of a set steering variable by a driver, several travel sensors for detecting travel dynamic variables, a steering control system by way of which a steering control variable, which is determined dependent on the output variables of the several travel sensors, is overlapped on the set steering variable, as well as at least one other control system that influences the performance of the motor vehicle, which evaluates data from the steering control system. The additional control system is especially a braking control system for stabilizing the vehicle stability by braking individual vehicle wheels. The additional control system evaluates the set steering variable overlapped by the steering control variable from the steering control system.

8 Claims, 2 Drawing Sheets

STEERING BOOSTER PROCESS AND STEERING BOOSTER SYSTEM IN A MOTOR VEHICLE

This application claims the priority of Germany, filed Mar. 30, 2001, the disclosure of which is expressly incorporated by reference herein.

BACKGROUND OF THE INVENTION

The present invention concerns a steering booster process and a steering booster system for a motor vehicle having a steering arrangement for the input of a set steering variable by a driver, several travel sensors for detecting travel dynamic variables, a steering control system by way of which a steering control variable, which is determined depending on the output variables of the several travel sensors, is overlapped or imposed on the set steering variable, as well as at least one other control system that influences the performance of the motor vehicle. This additional control system evaluates data from the steering control system and is especially used as a braking control system for stabilizing the vehicle stability by braking individual vehicle wheels.

In future vehicles manufactured in series, control systems that work by way of a steering intervention and which are designated in the following description as steering control systems should also be used in addition to the currently usual brake control systems (dynamic stability control DSC). These steering control systems can either add or overlap an additional steering angle (overlapping steering UL) for a steering input of the driver or adjust the front wheel steering angle only according to a purely arithmetically determined adjusting command (steer-by-wire system SBW). While a so-called overlapping steering (UL) still has a mechanical steering column, the mechanical steering column in a SBW system is no longer provided.

In known braking control systems as well as in the above-mentioned steering control systems, two control circuits act almost simultaneously on the vehicle transverse dynamic. This way, mutual influences of the steering control system and the braking control system by way of its feedback paths can occur. These mutual influences of the steering control system and the braking control system can, however, lead to undesired brake interventions.

The same is valid if, aside from the steering control systems, instead of the braking control system or in addition to the same, another control system (which is not described in more detail herein) is provided in the motor vehicle, which can influence the performance of the motor vehicle and which does not only access at least one of the mentioned travel sensors for detecting the travel dynamic variables, but also receives data from the steering control system or takes into consideration or evaluates these data. Here it can also come to undesirable control interventions of this additional control system if the feedback paths of this additional control system and the above-mentioned steering control system mutually influence each other.

SUMMARY OF THE INVENTION

An object of the present invention is to provide a process in which the above-mentioned disturbing brake interventions or in general the interventions by way of the above-mentioned additional control system are reduced or precluded when the steering control system is active, or if its interventions are sufficient to attain a desired performance of the motor vehicle. Also, a correspondingly suitable arrangement is contemplated.

To attain this object, the additional control system evaluates the set steering variable overlapped by the steering control variable from the steering control system. The braking of individual vehicle wheels of the motor vehicle should especially take place with the mentioned braking control system dependent upon the set steering variable that is overlapped by the steering control variable.

The solution according to the invention is based especially on the following consideration. If the transverse dynamic signal flows that are decisive for the performance of the control systems are taken into consideration, it is determined that the input variables of the steering input of the driver in the braking control system (for example, DSC) that are important for this braking control system (DSC), are interpreted, on one hand, as a desired course of the driver and, on the other hand, as a variable for determining the front wheel angle. However, if the driver steering input is changed later by a steering intervention of an overlapping steering or a steer-by-wire system, so that the fixed combination between the driver steering input and the front wheel angle, which is independent from the vehicle transverse dynamic, is disturbed, then the braking control system (DSC) does not take this steering intervention into consideration. That is, the brake interventions that were carried out are not optimized by the braking control system.

According to the invention, therefore, not the driver steering input, but an "effective steering angle" is fed as input variable to the braking control system or in general to an additional control system aside from the steering control system, which can influence the performance of the motor vehicle. This means that the control circuits are unbundled. An "effective steering angle" is here and in the following description a "steering variable," which is connected by way of a mechanical transmission directly to the front wheel steering angle and is thus also determining for the vehicle reaction to a steering input such as the front wheel steering angle itself. The "effective steering angle" can be, for example, the output of the overlapping transmission or the displacement of the steering rack into the steering transmission.

According to the invention, the steering booster process and system for a motor vehicle having a steering arrangement for the input of a set steering variable by a driver, several sensors for detecting travel dynamic variables, a braking control system for stabilizing the vehicle stability by braking individual vehicle wheels, and a steering control system by way of which a steering control variable, which is determined dependent on the output variables of the several travel sensors, is overlapped on the set steering variable and is characterized by the braking of individual vehicle wheels by way of the braking control system depending on the set steering variable overlapped by the steering control variable, or when the braking control system is actuated by the set steering variable overlapped by the steering control variable. Instead of the braking control system or aside from the same a further (general) control system can here also be provided (as already explained above), which has an influence on the performance of the motor vehicle, and especially stabilizes its travel dynamic, and which for this purpose utilizes not only at least one of the mentioned travel sensors for detecting travel dynamic variables, but also receives data from the steering control system or takes into consideration or evaluates such data.

In the currently preferred configuration of the invention, the set steering variable is a desired steering angle and the steering control variable is a steering change angle, which is mathematically determined from the output variables of the several travel sensors. In another currently preferred embodiment of the invention, the set steering variable is a desired steering variable and the steering control variable is an auxiliary steering torque that is overlapped by way of an overlapping transmission on the desired steering torque.

It should also be mentioned that there is basically also another possibility for attaining the object of the invention, namely the entire control system is developed completely anew with the individual so-called subsystems (steering control system, braking control system, further control system), but such a new development is connected with a considerable time and cost expenditure. This is not a concern with the conversion of the invention.

As an advantage, the functional modularity of the algorithms for the overlapping control or a steer-by-wire system as well as a braking control system and/or at least one other mentioned control system is maintained. Thereby, the algorithms of these individual systems are neither newly developed or evaluated nor must be structurally changed. A new application such as, for example, for an integration of the overlapping steering with a braking control system or the like is fully sufficient. This again saves development costs and development time. The present invention offers, therefore, also an effective limitation of the complexity of these integrations and has in this way multiple positive effects on the entire development process with respect to time, costs, and effort.

Advantageously, the mentioned algorithms of the individual control systems can (but do not have to) run in separate control devices, which is convenient for the exchangeability of the supplied systems or their electronic control devices. Therefore, a possible control device failure does not have the failure of the entire system as a consequence, but only of those control systems that run in this defective control device. In the sense of a component system an advantageous variant control is also offered because the corresponding individual systems can be added or eliminated almost individually.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
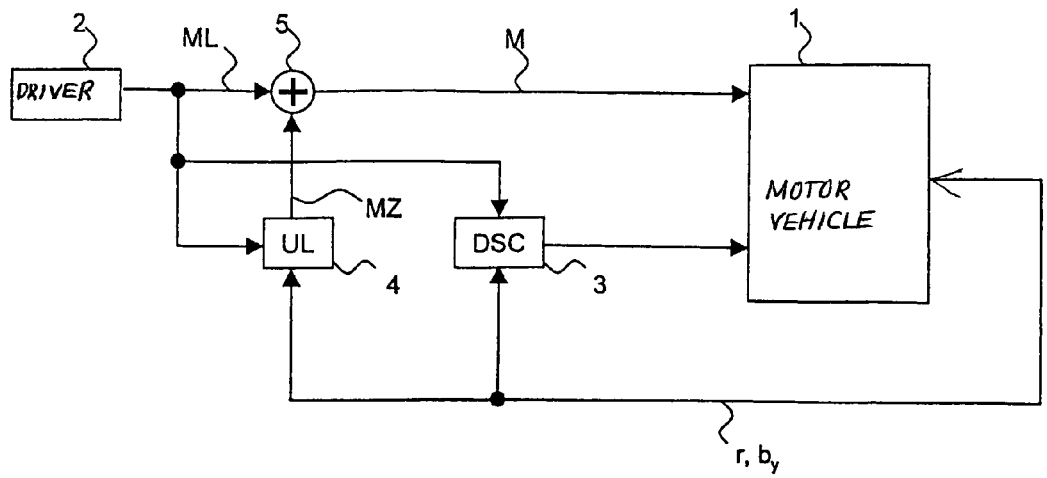
FIG. 1 schematically shows an overlapping steering system according to the state of the art.

FIG. 1 shows a motor vehicle 1 with a known steering arrangement (not shown) for the input of a steering setting by a driver 2. Several known types of travel sensors (not shown) for the detection of travel dynamic variables such as travel speed, transverse acceleration $b_y$, and the yaw r are used as input variables. These travel dynamic variables are considered in the intervention of auxiliary systems to stabilize the vehicle in critical situations. According to FIG. 1, the braking control system (DSC) 3 and the steering control system (UL) 4 are shown where the steering control of driver 2 uses the values given by the travel sensors of the vehicle for the transverse acceleration $b_y$, and the yaw r as input values.

The braking control system (DSC) 3 serves to increase the vehicle stability by braking individual vehicle wheels with the aid of r and $b_y$, so that the traveling safety is maintained. Aside from the values of $b_y$ and r, the steering setting of the driver is also considered.

In the vehicle system shown schematically in FIG. 1, the steering control system 4 is an overlapping steering designated UL, which dependent on the steering torque ML of the driver, overlaps an additional torque MZ on this steering torque ML by way of an overlapping transmission 5, so that the effective steering torque M that actually acts on the results of the steering wheels. The values for the transverse acceleration $b_y$ and the yaw r are taken into consideration when determining the required additional steering torque MZ. The values for the transverse acceleration $b_y$ represent also, aside from the steering torque ML of the driver 2, input variables of the steering control system (UL) 4. The additional steering torque MZ can serve to correct the steering angle of the vehicle if, due to the values of the travel sensors, it is determined that the traveling stability worsens; if the vehicle starts, for example, to skid, this is counteracted by the steering control system 4.

In vehicles that are provided with a steering control system (UL) 4 as well as with a braking control system (DSC) 3, a mutual influencing of the steering control system and the braking control system can occur and it can hence come to unexpected (seen as necessary for the traveling safety by the control) braking interventions of the braking control system 3. Since the braking control system 3, however, does not have available the actual effective steering torque M, but (taking into consideration the values for the transverse acceleration $b_y$ and the yaw r) goes out directly from the steering torque ML of the driver 2, the interventions of the braking control system (USC) can be superfluous and even counterproductive.

As to preclude these braking interventions by the braking control system (USC) 3 with a simultaneously active steering control system, the braking control system 3 is actuated according to the invention by an effective steering variable (effective steering angle) and no longer directly by way of a set steering variable inputted by the driver 2. This means that in the effective steering torque M, which is the input variable of the braking control system 3, the additional steering torque MZ is already included. The braking of individual vehicle wheels by the braking control system 3 takes place also dependent on the set steering variable ML overlapped by the steering control variable MZ.

Figure 2:
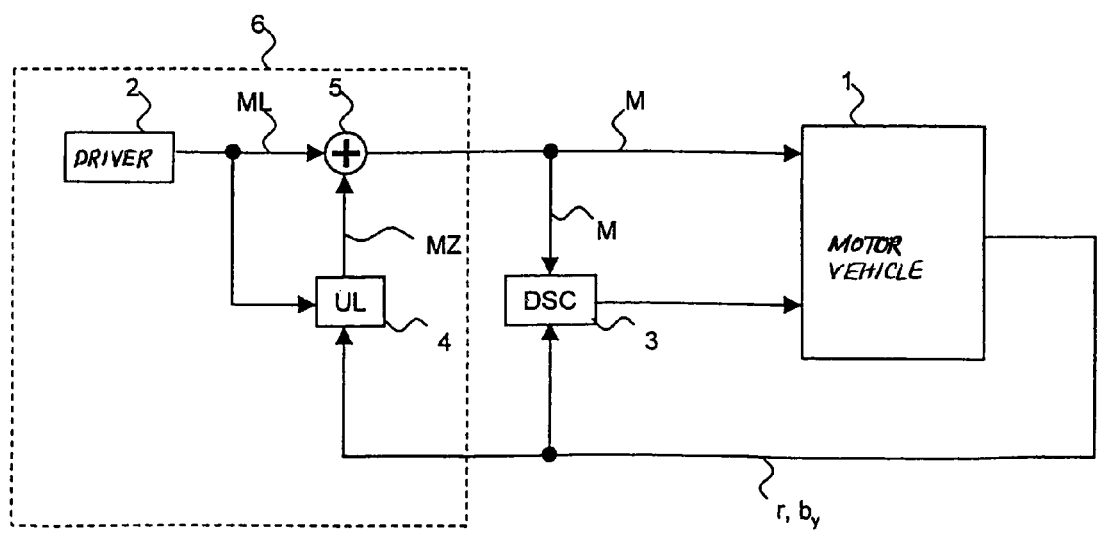
FIG. 2 schematically shows an embodiment of an overlapping steering system according to the present invention.

The corresponding schematic block diagram is shown in FIG. 2. The corresponding elements with the same function are provided with the same reference numerals in FIGS. 1 and 2.

Even though the block diagram of FIG. 2 has the same elements as FIG. 1, their logical allocation or arrangement in FIGS. 1 and 2 is different. In FIG. 2, the driver 2 and overlapping steering 4 with overlapping transmission 5 are joined into a "virtual" driver 6. This "virtual" driver 6 applies a steering torque on the steered wheels of the vehicle 1, which is the actual steering torque M that acts on the steered wheels. This effective steering torque M is fed to the braking system (DSC) 3 as an input variable. A braking intervention is controlled by the braking system 3 (while taking into consideration the values for the transverse acceleration $b_y$ and the yaw r) on the basis of this steering torque M and no longer on the basis of the direct driver input.

The invention is not limited to the overlapping steering system, but can also be applied in steer-by-wire systems (SBW systems). In the case of a SBW system, the logic integration is illustrated as in FIG. 3.

Figure 3:
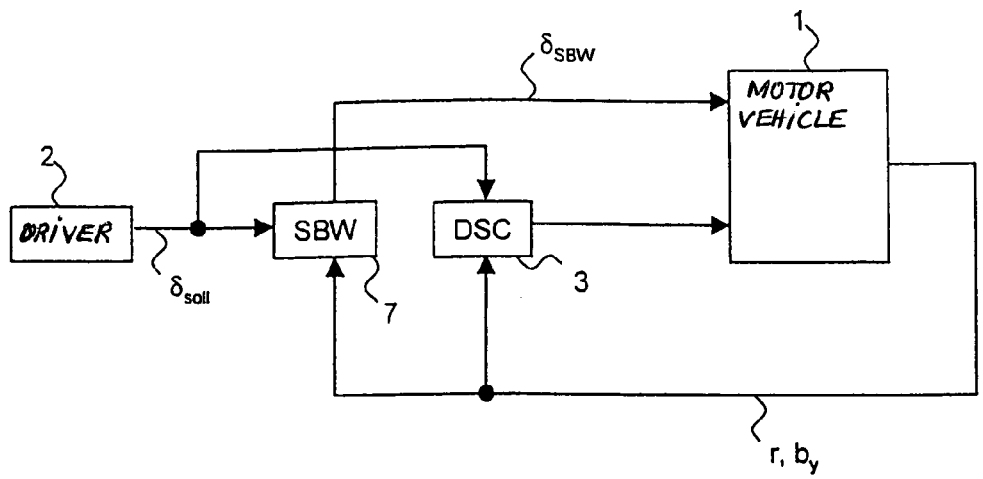
FIG. 3 schematically shows a steer-by-wire system according to the state of the art.

In the vehicle system with vehicle 1 shown schematically in FIG. 3, the steering control system is a SBW system 7, which steers the wheels of the vehicle 1 dependent on a steering angle setting $\delta_{soll}$ of the driver 2. When determining the steering angle $\delta_{SBW}$ transmitted by the SBW system 7 to the vehicle 1, the values for the transverse acceleration $b_y$ and the yaw r are taken into consideration. Aside from the steering angle setting $\delta_{soll}$, the values for the transverse acceleration $b_y$ and the yaw r also represent input variables of the SBW steering control system 4. The steering angle $\delta_{SBW}$ deviates from the steering angle setting $\delta_{soll}$ if it is determined based on the values of the travel sensors that the traveling stability worsens.

Also in vehicles with a SBW system 7, a mutual influencing of the SBW steering control system 7 and the braking control system 3 can occur and hence it can come to unexpected (considered as necessary by the control for the traveling safety) braking interventions of the braking control system 3. Since the braking control system 3 does not have available the current steering angle $\delta_{SWB}$, but (taking into consideration the values for the transverse acceleration $b_y$ and the yaw r) emanate directly from the steering angle setting $\delta_{soll}$ of the driver 2, the interventions of the braking control system can be superfluous and even counterproductive.

Figure 4:
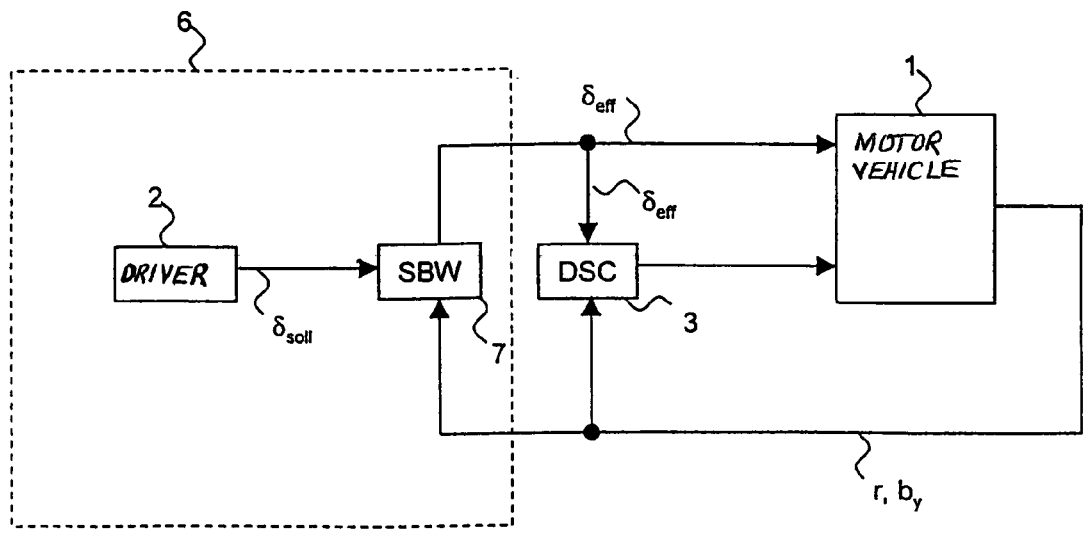
FIG. 4 schematically shows an embodiment of a steer-by-wire system of the present invention.

By way of the new grouping according to the invention of the elements of FIG. 3 the integration results according to FIG. 4. The corresponding elements with the same function are provided with the same reference numerals in FIGS. 3 and 4.

The logical allocation of the elements in the block diagram of FIG. 4 differs from that of FIG. 3. In FIG. 4, the elements driver 2 and SBW system 7 are joined into a "virtual" driver 6. This "virtual" driver 6 transmits a steering angle setting $\delta_{soll}$. The steering angle setting $\delta_{soll}$ is fed to the SBW system in which an effective steering angle $\delta_{eff}$ is generated, while taking into consideration the values of the transverse acceleration $b_y$ and the yaw r and other variables. This effective steering angle $\delta_{eff}$ is transmitted as input variable, on one hand, to the vehicle 1 for implementing the (modified) steering setting and, on the other hand, to the braking system 3. A braking intervention is initiated by the braking system 3 based on the effective steering angle $\delta_{eff}$ and no longer on the direct driver input, that is, the steering angle setting $\delta_{soll}$.

The steering booster system for implementing the above-described process has the ability to activate the braking control system 3 by way of the set steering variable ML or $\delta_{soll}$ overlapped by the steering control variable MZ or $\delta_{SBW}$.

In the case of the overlapping steering 4, the set steering variable is the desired steering torque ML transmitted by way of a mechanical steering column and the steering control variable is an angle that is additionally applied by way of the additional steering torque MZ. In the case of the SBW system 7, the set steering variable is a desired steering angle $\delta_{soll}$, and the steering change angle $\delta_{eff}$ is determined mathematically as a steering variable from the desired steering angle $\delta_{soll}$ and the output variables of the several travel sensors, namely the transverse acceleration $b_y$ and the yaw r.

In the case of the overlapping steering integrated with a dynamic stability control (DSC), everything that steers the overlapping steering could also be generated without overlapping steering by a driver by way of the steering input. The driver steering input would then be equal to the steering angle sum. From the point of view of a dynamic stability control (DSC), the driver steering input and the steering control system can therewith no longer be differentiated and are shown together by the effective steering angle as a "modified" or "virtual" driver.

The invention has been described in detail with reference to two currently preferred configurations wherein only one braking control system is provided for the additional control system in addition to a steering control system. As an alternative or parallel to this configuration, another or further control system can also be provided to influence the motor vehicle's performance. This additional system utilizes not only at least one of the above-mentioned travel sensors for the detection of travel dynamic variables but also receives data from the steering control system or takes into consideration or evaluates such data.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering booster process for a motor vehicle having a steering arrangement for the input of a set steering variable by a driver, a plurality of travel sensors for detecting travel dynamic variables, a steering control system configured to determine a steering control variable dependent on output variables of the travel sensors, which steering control variable overlaps and is thereby superimposed on the set steering variable, and at least one further control system comprising a brake control system configured to influence performance of the motor vehicle and evaluate steering control system information for stabilizing motor vehicle stability by braking individual vehicle wheels of the motor vehicle comprising operating the at least one further control system to evaluate the set steering variable overlapped by the steering control variable from the steering control system.

2. The steering booster process according to claim 1, further comprising braking the individual vehicle wheels by the braking control system dependent on the set steering variable overlapped by the steering control variable.

3. The steering booster process according to claim 1 or 2, wherein the set steering variable is a desired steering angle and the steering control variable is a steering change angle mathematically determined depending on the desired steering angle and output values of the travel sensors.

4. The steering booster process according to claim 1 or 2, wherein the set steering variable is a desired steering torque and the steering control variable is an additional steering torque which overlaps the desired steering torque by way of an overlapping transmission.

5. A steering booster system for a motor vehicle, comprising a steering arrangement configured to input a set steering variable by a driver, a plurality of travel sensors configured to detect travel dynamic variables, a steering control system configured to determine a steering control variable dependent on output variables of the travel sensors, which steering control variable overlaps and is thereby superimposed on the set steering variable and at least one additional control system comprising a brake control system that influences the performance of the motor vehicle, evaluates steering control system information and stabilizes the motor vehicle by braking individual vehicle wheels of the motor vehicle, wherein the at least one additional control system is configured to evaluate the set steering variable overlapped by the steering control variable from the steering control system.

6. The steering booster system according to claim 5, wherein the braking control system is configured to be actuated by the set steering variable overlapped by the steering control variable.

7. The steering booster system according to claim 5 or 6, wherein the steering control system is a steer-by-wire system in which the set steering variable is a desired steering angle and a steering change angle is mathematically determined from the desired steering angle and the output variables of the travel sensors.

8. The steering booster system according to claim 5 or 6, where the steering control system is an overlapping steering system in which the set steering variable is a desired steering torque transmitted by a mechanical steering column and the steering control variable is an additional steering torque generated by an overlapping transmission.

* * * * *